US012759473B2

(12) United States Patent
Hwang et al.

(10) Patent No.: US 12,759,473 B2
(45) Date of Patent: Oct. 13, 2026

(54) DEVICE FOR FIXING CONVENIENT FEATURE FOR VEHICLE

(71) Applicants: Hyundai Motor Company, Seoul (KR); Kia Corporation, Seoul (KR)

(72) Inventors: Jin Ho Hwang, Cheonan-Si (KR); Dong Eun Cha, Hwaseong-Si (KR); Sang Heon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 758 days.

(21) Appl. No.: 18/134,428

(22) Filed: Apr. 13, 2023

(65) Prior Publication Data

US 2024/0190357 A1 Jun. 13, 2024

(30) Foreign Application Priority Data

Dec. 9, 2022 (KR) ........................ 10-2022-0171638

(51) Int. Cl.
*B60R 11/02* (2006.01)

(52) U.S. Cl.
CPC .................................... *B60R 11/02* (2013.01)

(58) Field of Classification Search
None
See application file for complete search history.

(56) References Cited

U.S. PATENT DOCUMENTS 9,396,858 B2 * 7/2016 Kamiunten ........... F16F 15/035
10,549,659 B2 2/2020 Sullivan et al.
11,335,998 B2 5/2022 Hanaoka
12,106,896 B2 * 10/2024 Lee ......................... H01F 6/006
2006/0232367 A1 * 10/2006 Shen .................... B23Q 3/1546 335/289
2008/0223092 A1 * 9/2008 Defert ................. E05B 65/1086 70/144
2011/0248806 A1 * 10/2011 Michael .................... H01F 7/04 335/295

FOREIGN PATENT DOCUMENTS

KR 10-2004-0049094 6/2004
KR 10-2019-0141897 12/2019

* cited by examiner

*Primary Examiner* — Bernard Rojas
(74) *Attorney, Agent, or Firm* — MORGAN, LEWIS & BOCKIUS LLP

(57) ABSTRACT

An apparatus of fixing a convenient feature for a vehicle, includes a fixing module including an internal space, and a housing provided in the internal space of the fixing module and including a magnetic module therein, the housing being configured to slide toward the convenient feature based on the fixing module, to allow the magnetic module to be accommodated on an armature of the convenient feature when the housing slides toward the convenient feature, and to fix the convenient feature to the fixing module by a fixing force of the magnetic module in a state in which the magnetic module is accommodated on the armature.

13 Claims, 6 Drawing Sheets

DEVICE FOR FIXING CONVENIENT FEATURE FOR VEHICLE

CROSS-REFERENCE TO RELATED APPLICATION

The present application claims priority to Korean Patent Application No. 10-2022-0171638 filed on Dec. 9, 2022, the entire contents of which is incorporated herein for all purposes by this reference.

BACKGROUND OF THE PRESENT DISCLOSURE

Field of the Present Disclosure

The present disclosure relates to a device for fixing a convenient feature for a vehicle, and more particularly, to a device for fixing a convenient feature for a vehicle, which makes it easy to attach or detach a convenient feature, which is provided for convenience for an occupant, in a vehicle and automatically supplies power to the convenient feature.

Description of Related Art

Recently, as there is increasing interest in environment, the number of motorized vehicles using electric motors as power sources is increasing.

In the motorized vehicle, a wide indoor space, which is similar to a living room, is implemented by an advantage of a flat floor which is one of the characteristics of the vehicle. For example, in the case of an autonomous vehicle, a purpose-built vehicle (PBV), and a vehicle provided with three rows of seats, a plurality of bed-seat concepts has been provided to provide a place to rest and sleep while the vehicle travels. With an increase in independent leisure culture, demands for camping or traveling while sleeping in the vehicle are also increasing.

As convenient features are mounted in the vehicle as described above, an internal space of the vehicle is reconstructed and used in various forms to meet various purposes.

Meanwhile, in case that the convenient feature, which is provided according to a concept, is fixed in the internal space of the vehicle, it is difficult to attach or detach the convenient feature. In case that the convenient feature is not fixed in the internal space of the vehicle, the convenient feature is unstable against external impact because the convenient feature is not fixed.

Therefore, there is a demand for a solution that makes it easy to attach or detach the convenient feature and automatically supplies power to the convenient feature in a state in which the convenient feature is fixed in the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus of fixing a convenient feature for a vehicle, which makes it easy to attach or detach a convenient feature, which is provided for convenience for an occupant, in a vehicle and automatically supplies power to the convenient feature.

Technical problems to be solved by the present disclosure are not limited to the above-mentioned technical problems, and other technical problems, which are not mentioned above, may be clearly understood from the following descriptions by those skilled in the art to which the present disclosure pertains.

According to one aspect, there is provided an apparatus of fixing a convenient feature for a vehicle, the apparatus including: a fixing module including an internal space; and a housing provided in the internal space of the fixing module and including a magnetic module therein, the housing being configured to slide toward the convenient feature based on the fixing module, to allow the magnetic module to be accommodated on an armature of the convenient feature when the housing slides toward the convenient feature, and to fix the convenient feature to the fixing module by a fixing force of the magnetic module in a state in which the magnetic module is accommodated on the armature.

For example, fixing portions may be provided at two opposite sides of the fixing module and surround the housing, and a plurality of movable portions may be embedded in internal surfaces of the fixing portions.

For example, the housing may slide toward the convenient feature based on the fixing module by the plurality of movable portions embedded in the internal surfaces of the fixing portions.

For example, a lateral end portion of the housing may be in contact with the movable portions, and the movable portions may be pressed by the housing and rotated in a direction in which the housing slides.

For example, a fixing groove may be recessed upwards from a lower surface of the convenient feature, a protruding portion may extend upwards from the fixing module, and the protruding portion may be inserted into the fixing groove when the housing slides upwards.

For example, the fixing groove may have a quadrangular shape, and the protruding portion may have a shape of a sphere protruding upwards.

For example, a diameter of the protruding portion may be smaller than a length of each side of the fixing groove.

For example, the protruding portion may be provided as a plurality of protruding portions formed on an upper portion of the fixing module.

For example, the housing may be connected to a first power terminal, which supplies power to the magnetic module so that the magnetic module generates the fixing force, and a second power terminal which supplies power to the convenient feature in a state in which the convenient feature is fixed to the fixing module.

For example, the second power terminal may move upward, together with the magnetic module, to supply power to the convenient feature when the magnetic module slides upwards.

For example, an insulation portion may be inserted into a space between the second power terminal and the magnetic module of the housing, and the insulation portion may electrically insulate the magnetic module and the second power terminal.

For example, the apparatus may further include an operation portion connected to the first power terminal and the second power terminal and configured to selectively supply power to the convenient feature and the magnetic module, in which the operation portion supplies power to the convenient feature and the magnetic module in a state in which the housing slides upwards.

For example, the operation portion may supply power to the convenient feature through the second power terminal in a state in which power is supplied to the magnetic module.

According to the apparatus of fixing a convenient feature for a vehicle according to an exemplary embodiment of the present disclosure, the convenient feature provided for convenience for an occupant may be easily attached or detached, and power may be automatically supplied to the convenient feature.

The effects capable of being obtained by the present disclosure are not limited to the aforementioned effects, and other effects, which are not mentioned above, will be clearly understood by those skilled in the art from the following description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
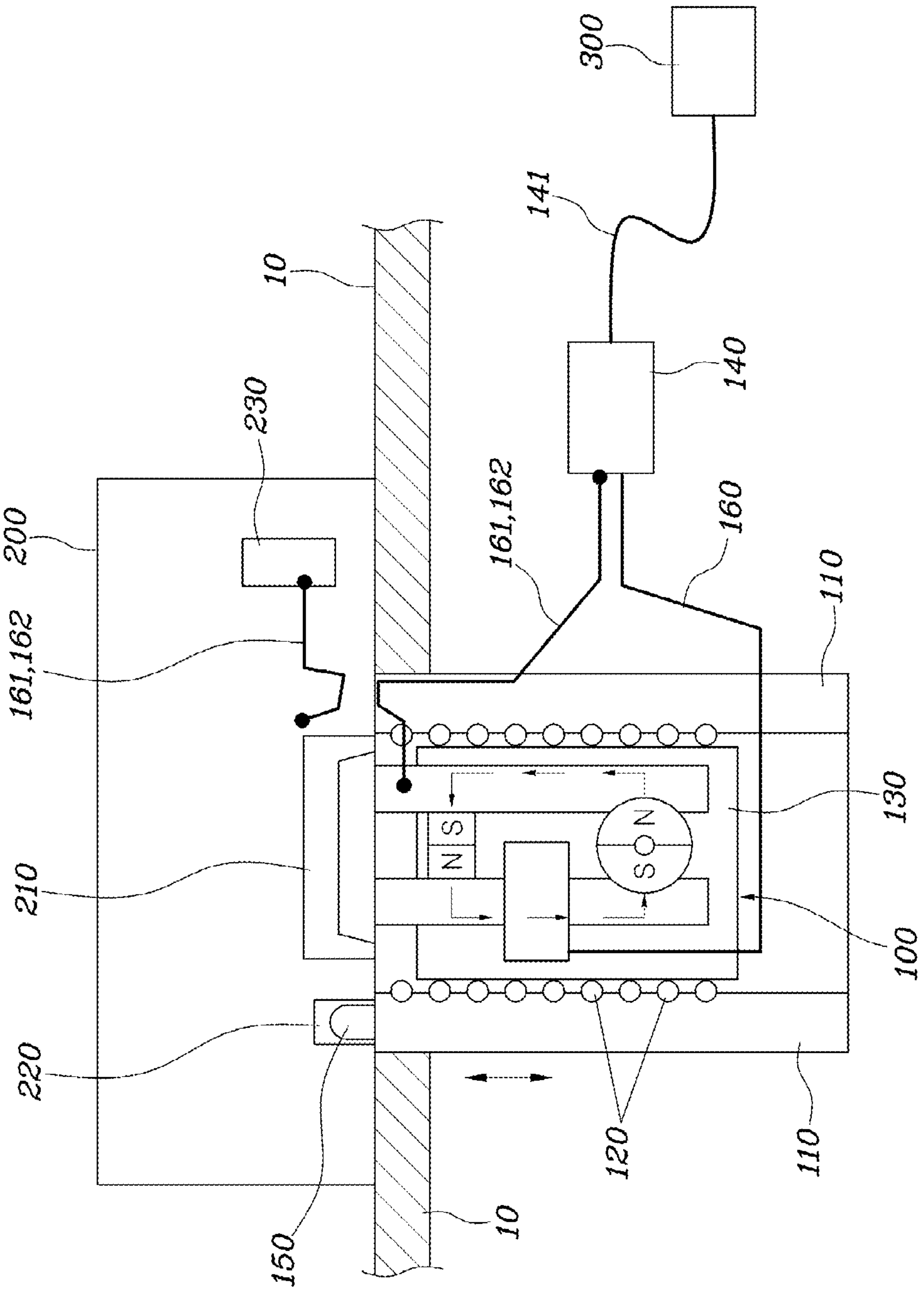
FIG. 1 is a view exemplarily illustrating a device configured for fixing a convenient feature for a vehicle according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION OF THE PRESENT DISCLOSURE

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings. The same or similar constituent elements are assigned with the same reference numerals regardless of reference numerals, and the repetitive description thereof will be omitted.

The suffixes "module", "unit", "part", and "portion" used to describe constituent elements in the following description are used together or interchangeably to facilitate the description, but the suffixes themselves do not have distinguishable meanings or functions.

In the description of the exemplary embodiments included in the present specification, the specific descriptions of publicly known related technologies will be omitted when it is determined that the specific descriptions may obscure the subject matter of the exemplary embodiments included in the present specification. Furthermore, it should be interpreted that the accompanying drawings are provided only to allow those skilled in the art to easily understand the exemplary embodiments included in the present specification, and the technical spirit included in the present specification is not limited by the accompanying drawings, and includes all alterations, equivalents, and alternatives that are included in the spirit and the technical scope of the present disclosure. The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or directly connected to another constituent element, and an intervening constituent element can also be present between the constituent elements. When one constituent element is described as being "directly coupled to" or "directly connected to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

An exemplary embodiment of the present disclosure proposes a configuration that makes it easy to attach or detach a convenient feature in a vehicle and automatically supplies power to the convenient feature.

FIG. 1 is a view exemplarily illustrating a device configured for fixing a convenient feature for a vehicle according to an exemplary embodiment of the present disclosure.

FIG. 1 is mainly focused on constituent elements related to the exemplary embodiment of the present disclosure. However, an actually implemented device configured for fixing a convenient feature for a vehicle may include more or fewer constituent elements.

Referring to FIG. 1, a device configured for fixing a convenient feature 200 for a vehicle according to various exemplary embodiments of the present disclosure may include a fixing module 100 and a housing 130.

First, a vehicle floor 10 is configured as a floor of an internal space of a vehicle and has a flat structure. The fixing module 100 may be mounted and fixed onto the vehicle floor 10, an internal trim, an external panel, or the like. In a structure in which the fixing module 100 is disposed in advance, the convenient feature 200 may be disposed and fixed above the fixing module 100. The fixing module 100 will be described in detail. The fixing module 100 may have an internal space. Fixing portions 110 may be formed at two opposite sides of the fixing module 100 and surround the housing 130 provided in the internal space of the fixing module 100. A plurality of movable portions 120 embedded in internal surfaces of the fixing portions 110 enables the housing 130 to smoothly slide in an upward/downward direction toward the convenient feature 200.

Furthermore, magnetic modules 131, 132, and 133 may be provided inside the housing 130. The magnetic modules 131, 132, and 133 may include a pole 131, a coil 132, and a magnet 133. In case that the magnetic modules 131, 132, and 133 slide toward the convenient feature 200 of the housing 130 and are accommodated on an armature 210 of the convenient feature 200, the convenient feature 200 may be fixed to the fixing module 100 by a fixing force. Therefore, the convenient feature 200 is not fixed by physical fastening between the fixing module 100 and the convenient feature 200.

Therefore, there is no concern that the convenient feature 200 is damaged by being repeatedly fastened.

The fixing force of the magnetic modules 131, 132, and 133 may be generated by a magnetic work-holding technology. The magnetic work-holding technology is a technology for fixing and releasing an object by controlling a magnetic force of the permanent magnet 133 by use of instantaneous electric current. The fixing force may be generated based on a magnetic control technology, which is a technology for rapidly controlling all N and S magnetic paths with a small amount of electric current, a magnetic circuit technology, which is a technology for disposing maximum magnetic energy in a three-dimensional, minimum space, and a magnetic flow principle which is a principle that shortens and simplifies N and S magnetic flow routes.

Meanwhile, the convenient feature 200 may be positioned above the vehicle floor 10 and have the armature 210 provided at a lower end portion thereof. A power terminal may be connected to the inside of the armature 210 and connected to a power source in the convenient feature 200 through a second connector 230 so that power may be supplied to the convenient feature 200. As another exemplary embodiment of the present disclosure, the same fixing module 100 may be applied, through a sub-structure of the armature 210, to the convenient feature 200 disposed outside a vehicle, such as an external component such as a roof rack, or a composite material structure of an external plate of a vehicle body, in addition to the convenient feature 200 disposed inside the vehicle.

Figure 2:
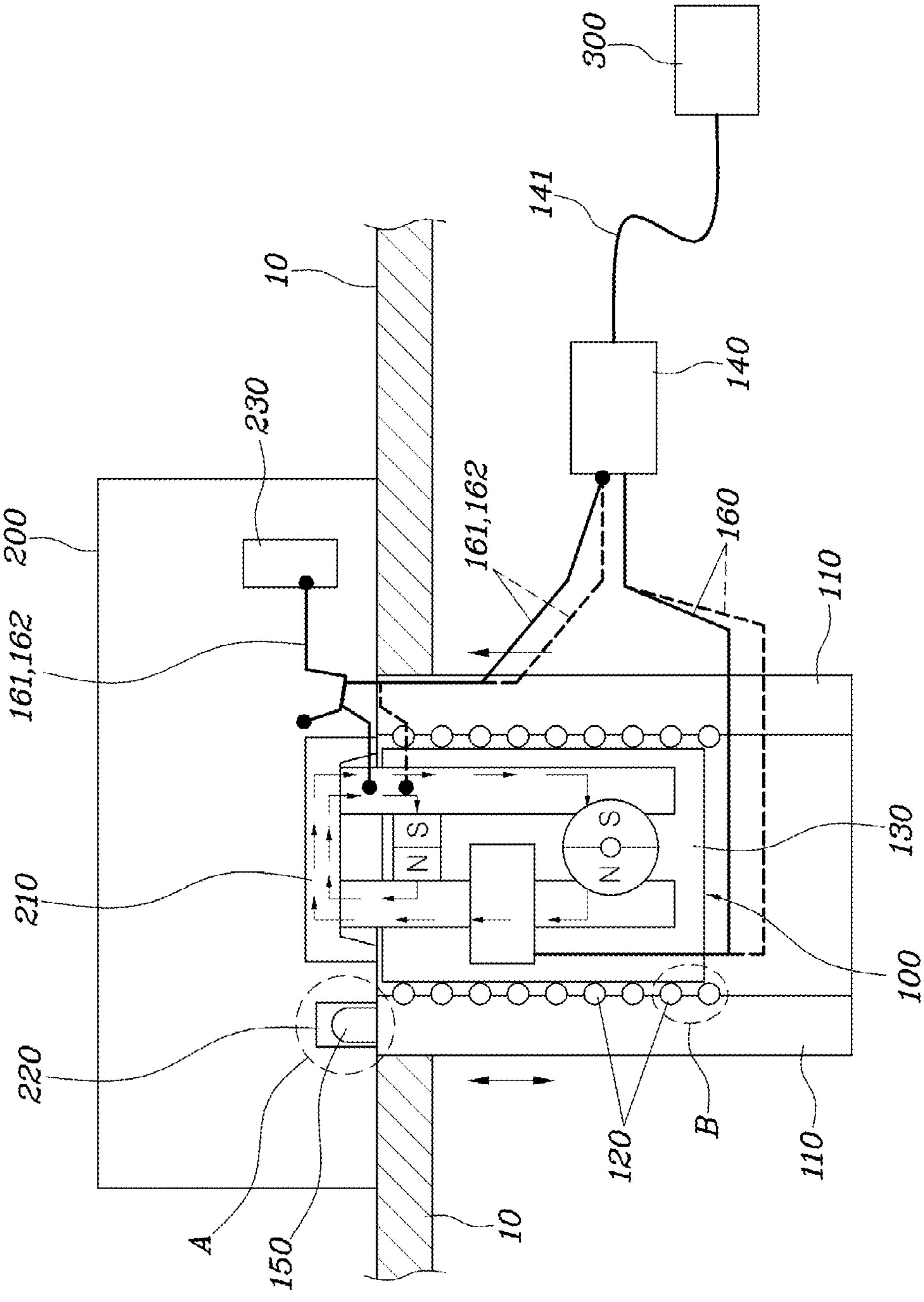
FIG. 2 is a view exemplarily illustrating the device configured for fixing a convenient feature for a vehicle according to the exemplary embodiment of the present disclosure in which a housing slides upwards.

FIG. 2 is a view exemplarily illustrating the device configured for fixing the convenient feature 200 for a vehicle according to the exemplary embodiment of the present disclosure in which the housing 130 slides toward the convenient feature 200.

Referring to FIG. 2, when power is supplied to the magnetic modules 131, 132, and 133 to fix the convenient feature 200, the magnetic force (fixing force) may pull the armature 210 so that the housing 130 may slide toward the convenient feature 200 by rotations of the plurality of movable portions 120 fixed to the fixing portions 110.

In the instant case, a lateral end portion of the housing 130 may be in contact with the movable portions 120, and the movable portions 120 may be pressed by the lateral end portion of the housing 130 and rotated in a direction in which the housing 130 slides so that the housing 130 may slide softly in the upward/downward direction thereof. The movable portion 120 may be provided in a form of a ball plunger or a ball roller. As illustrated in region B in FIG. 2, the movable portions 120 may be embedded in the internal surfaces of the fixing portions 110.

Furthermore, the fixing module 100 may be connected to power sources through a connector, and the power sources may be classified into a power source for operating the magnetic modules 131, 132, and 133 and a power source for connecting the convenient feature 200. To the present end, a first power terminal 160 and second power terminals 161 and 162 may be connected to the housing 130.

The first power terminal 160 may be connected to the coil 132 and supply power to the magnetic modules 131, 132, and 133 so that the magnetic modules 131, 132, and 133 generate the fixing force. Furthermore, the second power terminals 161 and 162 may supply power to the convenient feature 200 in the state in which the convenient feature 200 is fixed to the fixing module 100. The second power terminals 161 and 162 may include a + power terminal 161 and a – power terminal 162 and be respectively connected to first and second opposite end portions of the pole 131.

As illustrated in FIG. 2, the second power terminals 161 and 162 may move upward, together with the magnetic modules 131, 132, and 133, to supply power to the convenient feature 200 when the magnetic modules 131, 132, and 133 slide toward the convenient feature 200. When the housing 130 slides toward the convenient feature 200, the second power terminals 161 and 162 fixed to lateral sides of the pole 131 also move to come into contact with the convenient feature 200 so that the power source is connected to the convenient feature 200.

Furthermore, a fixing groove 220 may be formed in the convenient feature 200, a protruding portion 150 may be formed on the fixing module 100, and the protruding portion 150 may be inserted into the fixing groove 220 so that a position of the convenient feature 200 and a position of the fixing module 100 may be regulated.

The fixing groove 220 may be recessed upwards from the lower surface of the convenient feature 200, and the protruding portion 150 may be fixed to an upper surface of the fixing portion 110 and extend upwards. A height to which the protruding portion 150 protrudes may not be high so that the protruding portion 150 is configured to regulate a movement of a position of the convenient feature 200 in a traverse direction thereof. With the structure in which the protruding portion 150 is inserted and fitted into the fixing groove 220 when the housing 130 slides toward the convenient feature 200, the convenient feature 200 may not be released from the fixing module 100 as long as the fixing module 100 is not detached even by impact occurring from the inside/outside of the convenient feature 200. Therefore, it is possible to improve stability of the fixing device.

Figure 3:
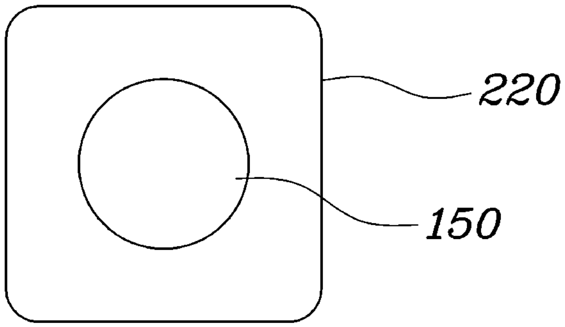
FIG. 3 is a view exemplarily illustrating shapes of a fixing groove and a protruding portion according to the exemplary embodiment of the present disclosure.

FIG. 3 is a view exemplarily illustrating shapes of the fixing groove 220 and the protruding portion 150 according to the exemplary embodiment of the present disclosure.

Referring to FIG. 3, the fixing groove 220 may have a quadrangular shape, and the protruding portion 150 may have a shape of a sphere protruding upwards. This is to allow the protruding portion 150 to be softly inserted into the fixing groove 220 when the housing 130 slides toward the convenient feature 200. A diameter of the protruding portion 150 may be smaller than a length of each side of the fixing groove 220. Therefore, it is possible to absorb internal/external impact against the convenient feature 200 having predetermined strength in the state in which the protruding portion 150 is inserted into the fixing groove 220 so that the fixing force between the convenient feature 200 and the fixing module 100 may be further increased.

Meanwhile, in the device configured for fixing the convenient feature 200 for a vehicle according to an exemplary embodiment of the present disclosure, only the pole 131, the protruding portion 150, the second power terminals 161 and 162, and the fixing portions 110 are exposed to the outside thereof, but the other components are covered by the housing 130. In case that a cover is applied to the fixing portion 110, the portions externally exposed may be further minimized.

Figure 4:
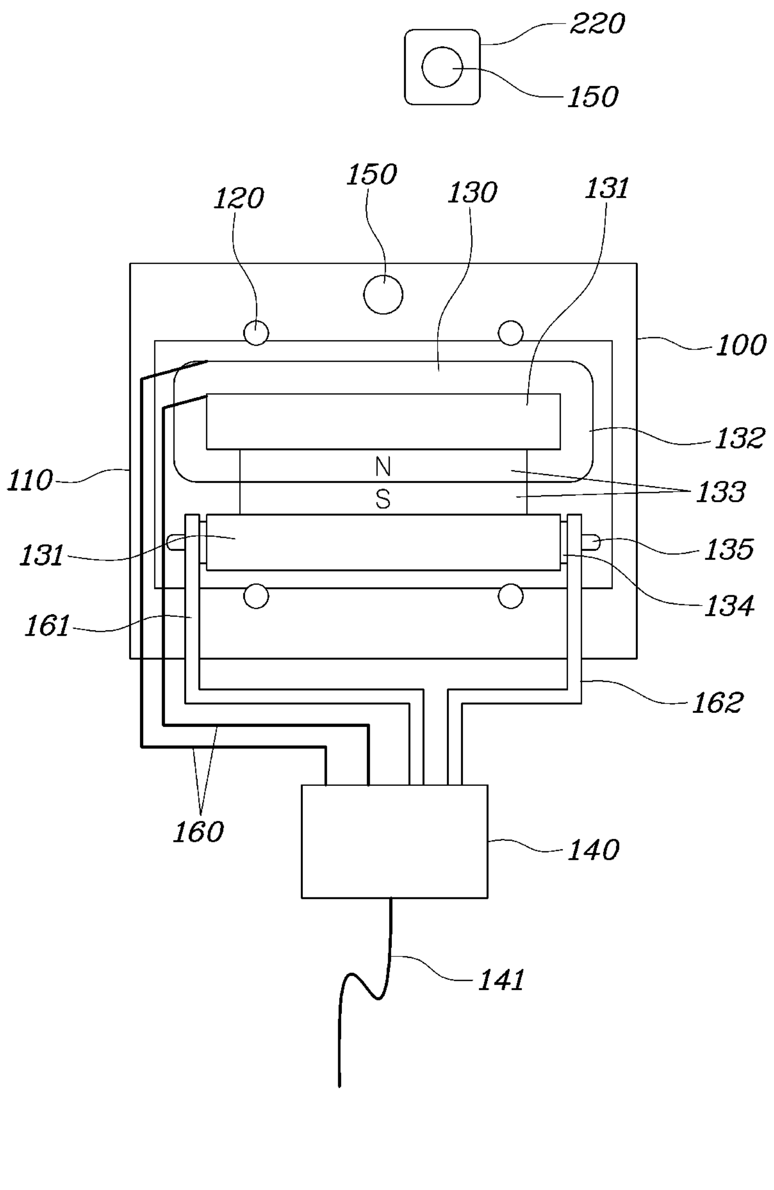
FIG. 4 is a view exemplarily illustrating the device configured for fixing a convenient feature for a vehicle according to the exemplary embodiment of the present disclosure when viewed from above.
Figure 5:
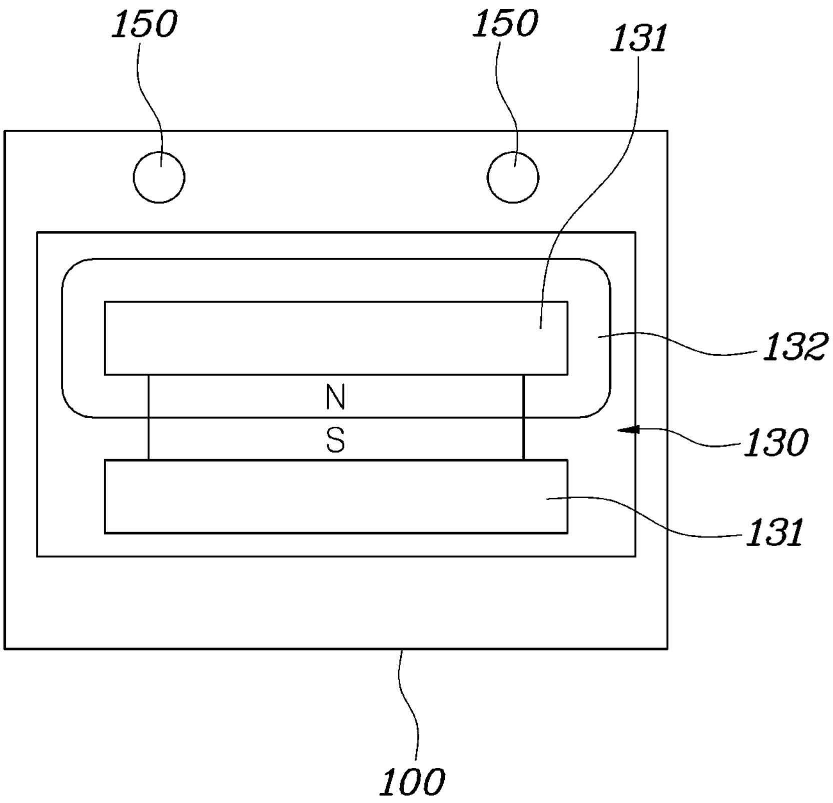
FIG. 5 is a view exemplarily illustrating that a plurality of protruding portions according to the exemplary embodiment of the present disclosure is formed above a fixing module.

FIG. 4 is a view exemplarily illustrating the device configured for fixing the convenient feature 200 for a vehicle according to the exemplary embodiment of the present disclosure when viewed from above, and FIG. 5 is a view exemplarily illustrating that a plurality of protruding portions 150 according to the exemplary embodiment of the present disclosure is provided above the fixing module 100.

Referring to FIG. 4, like the above-mentioned structure, a plurality of convenient features 200 may be fixed to the fixing module 100 by the structure in which the protruding portions 150 are inserted into the fixing grooves 220. The protruding portion 150 of each of the fixing modules 100 may be inserted and fixed into the fixing groove 220 of each of the convenient features 200 in a state in which the plurality of fixing modules 100 is provided and fixed below the vehicle floor 10.

As another exemplary embodiment of the present disclosure, the plurality of protruding portions 150 may be formed on an upper portion of the fixing module 100. In the instant case, in case that the convenient features 200 are each small in size, the convenient features 200 may be fixed by the single fixing module 100. In case that the convenient features 200 are each large in size, the convenient features 200 may be fixed by the plurality of fixing modules 100. In the instant case, in case that the convenient feature 200 is large in size, the plurality of protruding portions 150 may be formed in the single fixing module 100, as illustrated in FIG. 5 so that the fixed state of the convenient feature 200 and the fixing module 100 may be maintained depending on the size of the convenient feature 200.

Figure 6:
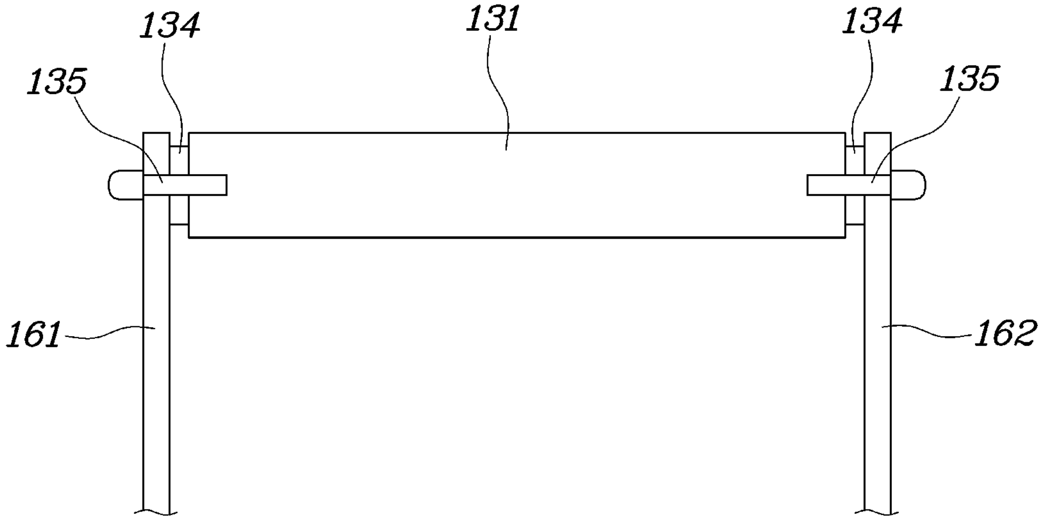
FIG. 6 is a view exemplarily illustrating an insulation portion inserted into a space between a second power terminal and a magnetic module according to the exemplary embodiment of the present disclosure.

FIG. 6 is a view exemplarily illustrating insulation portions 134 inserted into spaces between the magnetic modules 131, 132, and 133 and the second power terminals 161 and 162 according to the exemplary embodiment of the present disclosure.

Referring to FIG. 6, the insulation portions 134 may be inserted into the spaces between the second power terminals 161 and 162 and the magnetic modules 131, 132, and 133 of the housing 130. The + power terminal 161 and the − power terminal 162 of the second power terminals 161 and 162 may be respectively connected to the first and second opposite end portions of the pole 131 that forms the magnetic modules 131, 132, and 133. The insulation portions 134 may each be made of an insulating material having a flat shape and accommodated in the spaces between the magnetic modules 131, 132, and 133 and the second power terminals 161 and 162. With the above-mentioned structure, it is possible to electrically insulate the magnetic modules 131, 132, and 133 and the second power terminals 161 and 162, stably supplying power to the convenient feature 200 through the second power terminals 161 and 162.

Furthermore, as illustrated in FIG. 6, screws 135 may penetrate the pole 131, the second power terminals 161 and 162, and the insulation portion 134 so that the pole 131, the second power terminals 161 and 162, and the insulation portion 134 are fixed to one another. Like the insulation portion 134, the screw 135 may also be made of an insulating material and electrically insulate the pole 131, the second power terminals 161 and 162, and the insulation portion 134, stably supplying power to the convenient feature 200 through the second power terminals 161 and 162.

Furthermore, an operation portion 300 may be connected to the first power terminal 160 and the second power terminals 161 and 162 and selectively supply power to the convenient feature 200 and the magnetic modules 131, 132, and 133. The first power terminal 160 and the second power terminals 161 and 162 may be connected to a first connector 140, and the first connector 140 may be connected to the operation portion 300 through a signal line 141. The operation portion 300 may automatically supply power to the convenient feature 200 and the magnetic modules 131, 132, and 133 in the state in which the housing 130 slides toward the convenient feature 200 so that the process of fixing the convenient feature 200 and the process of connecting the power source to the convenient feature 200 may be simultaneously performed. Furthermore, the operation portion 300 may be connected in a form of a switch and implemented by an Audio, Video and Navigation (AVN) screen. In the instant case, a user may selectively supply power to the convenient feature 200 and the magnetic modules 131, 132, and 133.

Furthermore, the operation portion 300 may supply power to the convenient feature 200 through the second power terminals 161 and 162 in the state in which power is supplied to the magnetic modules 131, 132, and 133. This is to prevent a spark which may occur when the second power terminals 161 and 162 fixed to the lateral sides of the pole 131 move to come into contact with the convenient feature 200. Therefore, the operation portion 300 may supply power to the convenient feature 200 through the second power terminals 161 and 162 about one to two seconds after power is supplied to the fixing module 100 and the magnetic modules 131, 132, and 133 are accommodated on the armature 210 of the convenient feature 200 positioned above the vehicle floor 10.

Furthermore, in a general situation, the supply of power to the magnetic modules 131, 132, and 133 and the convenient feature 200 may cut off. Therefore, it is possible to prevent a short circuit from occurring because of moisture introduced into the fixing module 100 in a state in which the convenient feature 200 is not mounted and the fixing module 100 is exposed. The structure in which the + power terminal 161 and the − power terminal 162 are separated from first and second opposite end portions of the pole 131 may prevent the occurrence of a short circuit even in a situation in which moisture is introduced into the fixing module 100. In the instant case, the + power terminal 161 and the − power terminal 162 may be spaced apart by about 100 mm or more. Furthermore, a waterproof connector may be used as the first connector 140 and the second connector 230 to reduce a likelihood of a short circuit.

According to the exemplary embodiments of the present disclosure described above, the convenient feature provided for convenience for the occupant may be easily attached or detached, and power may be automatically supplied to the convenient feature.

In an exemplary embodiment of the present invention, a controller is connected to the operation portion 300 to control the operations thereof.

In addition, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips.

Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system and store and execute program instructions which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet). Examples of the program instruction include machine language code such as those generated by a compiler, as well as high-level language code that may be executed by a computer using an interpreter or the like.

In an exemplary embodiment of the present invention, each operation described above may be performed by a control device, and the control device may be configured by multiple control devices, or an integrated single control device.

In an exemplary embodiment of the present invention, the scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

In an exemplary embodiment of the present invention, the control device may be implemented in a form of hardware or software, or may be implemented in a combination of hardware and software.

In addition, the terms such as "unit", "module", etc. disclosed in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of fixing a convenient feature for a vehicle, the apparatus comprising:

a fixing module including an internal space; and a housing provided at the fixing module and including a magnetic module therein, the housing being configured to slide toward the convenient feature together with the fixing module by a magnetic force of the magnetic module, to allow the magnetic module to be accommodated on an armature of the convenient feature when the housing slides toward the convenient feature, and to fix the fixing module to the convenient feature by controlling the magnetic force of the magnetic module in a state in which the magnetic module is accommodated on the armature.

2. The apparatus of claim 1, further including a fixing portion, wherein the fixing portion is provided at an external side of the fixing module and configured to surround the housing, and wherein a plurality of movable portions is embedded in an internal surface of the fixing portion.

3. The apparatus of claim 2, wherein the housing slides toward the convenient feature based on the fixing module by the plurality of movable portions embedded in the internal surface of the fixing portion.

4. The apparatus of claim 2, wherein a lateral end portion of the housing is in contact with the movable portions, and the movable portions are pressed by the housing and rotated in a direction in which the housing slides.

5. The apparatus of claim 1, further including a fixing groove and a protruding portion, wherein the fixing groove is recessed upwards from a lower surface of the convenient feature, and wherein the protruding portion extends upwards from the fixing module, and the protruding portion is inserted into the fixing groove when the housing slides toward the convenient feature.

6. The apparatus of claim 5, wherein the fixing groove has a quadrangular shape, and the protruding portion has a shape of a sphere protruding upwards.

7. The apparatus of claim 5, wherein a diameter of the protruding portion is smaller than a length of each side of the fixing groove.

8. The apparatus of claim 5, wherein the protruding portion is provided in plural and the plurality of protruding portions is formed on an upper portion of the fixing module.

9. The apparatus of claim 1, further including a first power terminal and a second power terminal, wherein the housing is connected to the first power terminal, which supplies power to the magnetic module so that the magnetic module generates a fixing force, and wherein the second power terminal supplies power to the convenient feature in a state in which the convenient feature is fixed to the fixing module.

10. The apparatus of claim 9, wherein the second power terminal moves together with the magnetic module to supply the power to the convenient feature when the magnetic module slides toward the convenient feature.

11. The apparatus of claim 9, further including an insulation portion, wherein the insulation portion is inserted into a space between the second power terminal and the magnetic module of the housing, and the insulation portion electrically insulates the magnetic module and the second power terminal.

12. The apparatus of claim 9, further including:

an operation portion connected to the first power terminal and the second power terminal and configured to selectively supply power to the convenient feature and the magnetic module, wherein the operation portion supplies power to the convenient feature and the magnetic module in a state in which the housing slides toward the convenient feature.

13. The apparatus of claim 12, wherein the operation portion supplies power to the convenient feature through the second power terminal in a state in which power is supplied to the magnetic module.

* * * * *